3,290,275
PRODUCTION OF POLYMERIC COMPOSITIONS FROM PETROLEUM FRACTION
Preston L. Brandt, Chicago, Ill., assignor to Velsicol Chemical Corporation, Chicago, Ill., a corporation of Illinois
No Drawing. Filed July 26, 1965, Ser. No. 475,013
4 Claims. (Cl. 260—82)

This application is a continuation-in-part of my co-pending application Serial No. 173,124, filed February 14, 1962, now abandoned.

This invention relates to the production of polymeric compositions, and more particularly to the polymeric compositions produced by the interaction of dimers of isoprene, cis-piperylene and trans-piperylene, and codimers, trimers, cotrimers, and higher polymers of isoprene, cis-piperylene, trans-piperylene and cyclopentadiene.

It is known that polymeric compositions can be produced from certain petroleum streams containing unsaturated compounds by various polymerization methods. In the past, it has been found that a large number of these compositions were insoluble in bodied vegetable oils, for example, bodied linseed oil. Thus, many of the previous polymeric compositions were unsuitable as ingredients in varnishes, core oils and the like due to their poor solubility in vegetable oils.

In some cases, the polymeric compositions were improved so that they had sufficient solubility in vegetable oils and could be used in varnishes and the like. However, in attaining this desirable property, the compositions often became dark and/or discolored. Thus, to obtain the desired solubility in vegetable oil, the highly advantageous light color was sacrificed. Polymeric compositions which are to be utilized in certain applications such as varnishes, paints, and rubber compounding, necessarily must be light in color and preferably soluble in vegetable oil.

Therefore, it is one object of the present invention to provide a light colored polymeric composition.

It is another object of the present invention to provide a light colored polymeric composition having a high degree of solubility in vegetable oils.

Still another object of this invention is to provide a process for the production of light colored polymeric compositions having a high degree of solubility in vegetable oil.

These and other objects of the present invention will be readily apparent from the ensuing description.

The polymeric compositions of the present invention can be readily prepared by the process of this invention, which comprises the heating of a mixture of dimers of isoprene, cis-piperylene and trans-piperylene and codimers, trimers, cotrimers, and higher polymers of isoprene, cis-piperylene, trans-piperylene and cyclopentadiene in the liquid phase.

Thus it will be noted that the starting material for the process of this invention is a mixture of dimers, codimers, trimers, cotrimers and higher polymers of certain highly unsaturated compounds. The term "dimer" as used herein denotes a homopolymeric molecule composed of two molecules of a monomer which may be combined by adduction or other polymeric linkage. "Codimer" denotes a copolymeric molecule composed of one molecule of each of two different monomers. Similarly, "trimer" denotes a homopolymeric molecule composed of three molecules of the same monomer which may be combined as previously described; while "cotrimer" denotes a copolymeric molecule composed of three molecules of two or more different monomers. The term "higher polymers" denotes both homopolymers of four or more molecules of the same monomer per average molecule of homopolymer and copolymers of four or more molecules of two or more different monomers per average molecule of copolymer, combined as heretofore described.

The starting material for the process of the present invention is at least substantially free of monomeric, isoprene, cis-piperylene, trans-piperylene and cyclopentadiene and is further at least substantially, if not totally, free of dicyclopentadiene. This starting material is a mixture of dimers of isoprene, cis-piperylene, and trans-piperylene, and codimers, trimers, cotrimers and higher polymers of isoprene, cis-piperylene, transpiperylene and cyclopentadiene. It is preferred that the said dimers, codimers, trimers, and cotrimers comprise about 70% to about 85% by weight of the mixture, the remainder being the higher polymers previously defined. A typical starting material for the process of this invention has the following analysis based on monomeric units:

| | Percent |
|---|---|
| Isoprene | 36 |
| Trans-piperylene | 31 |
| Cyclopentadiene | 28 |
| Cis-piperylene | 5 |

Although the process of the present invention may be carried out with the starting material diluted or dissolved in an inert solvent or diluent, it is preferred to perform the process on starting material which is substantially free of solvent or diluent. It is further contemplated that the starting material may contain inert organic hydrocarbon compounds as impurities. Since these compounds neither react nor appear in the polymeric composition produced, their presence may be disregarded.

The starting material can be synthetically produced, e.g., by the thermal polymerization of selected amounts of isoprene, the piperylenes and cyclopentadiene in the absence of catalyst at a temperature sufficient to thermally polymerize the monomer, and sufficient to convert substantially all initially formed dicyclopentadiene into codimers and higher molecular weight polymers, but substantially lower than 300° C. After thermal polymerization, the polymerized product is distilled to remove unreacted monomers and yield a suitable starting material for the process of this invention as the residue.

More particularly, a starting material which is useful in the process of the present invention can be prepared by heating a liquid petroleum hydrocarbon feed stream composed substantially of saturated and unsaturated hydrocarbons to a temperature of between about 190° C. and about 290° C. at a pressure sufficient to maintain a liquid phase reaction in a substantially oxygen-free atmosphere and separating therefrom a material consisting substantially of from about 70% to about 85% by weight of dimers of isoprene, cis-piperylene and trans-piperylene, and codimers, trimers and cotrimers of isoprene, cis-piperylene, trans-piperylene and cyclopentadiene and from about 15% to about 30% by weight of higher polymers of isoprene, cis-piperylene, trans-piperylene and cyclopentadiene.

The liquid petroleum hydrocarbon feed stream described above is composed substantially of saturated and unsaturated hydrocarbons of less than about 6 carbon atoms, and may contain up to and including about 5% by weight of saturated and unsaturated hydrocarbons of 6 carbon atoms and lesser amounts of hydrocarbons of greater than 6 carbon atoms. This feed stream necessarily contains a substantial proportion of conjugated aliphatic and cyclic dienes and preferably contains between about 10 and about 80% by weight of the said dienes.

A typical preferred petroleum feed stream would be one with an A.P.I. gravity at 60° F. of about 60 to about 80 degrees and an A.S.T.M. boiling point range of from about 80° F. to about 165° F. Such a preferred typical feed stream may contain the following compounds and also hydrocarbon compounds which are not listed herein, provided they are within the specified boiling range and contain no more than 6 carbon atoms per molecule: butadiene, 2-methylbutene-1, 3-methylbutene-1, isoprene, 3,3-dimethylbutene-1, n-pentane, pentene-1, pentene-2, trans-pentene-2, 4-methylpentene-2, 2-methylpentene-1, pentadiene-1,4, trans-piperylene, cis-piperylene, cyclopentane, cyclopentene, cyclopentadiene.

As heretofore stated, the liquid petroleum hydrocarbon feed stream is heated to a temperature in the range of between about 190° C. and about 290° C. in an atmosphere which is substantially free of oxygen at a pressure sufficient to maintain a liquid phase reaction. Pressures sufficient to maintain a liquid phase reaction are from about 370 to about 500 pounds per square inch. The said feed stream is held at the stated temperature and pressure for a period which may vary from about 1 to about 12 hours. A convenient reaction time, especially when continuous reaction means are utilized, is about 2-6 hours' residence time.

The total reaction product from the above operation is preferably flash-distilled up to an overhead temperature of from about 65° C. to about 90° C. to recover the starting material for the present invention as the bottoms product. This starting material typically has an initial boiling point range of from 90° C. to about 150° C. and a final boiling point range of from about 330° C. to about 380° C.

As a critical feature of this invention, the starting material described above is heated in the liquid phase at a temperature above 300° C. This lower temperature limit is highly critical to this invention, since heating at temperatures lower than 300° C. results in a polymeric composition which is insoluble in vegetable oils. While a soluble product is produced by heating at temperatures above 300° C., the color darkens and discolors in proportion to the higher temperature utilized. Therefore, it is preferred to heat the starting material at a temperature above 300° and below 330° C., since heating at temperatures higher than 330° C., results in a composition which is too dark and/or badly discolored to be used in applications requiring light colored, vegetable oil-soluble compositions, such as the applications heretofore described for the polymeric compositions of the present invention.

The starting material is heated in an atmosphere which is substantially free of oxygen at a pressure sufficient to maintain a liquid phase during the heat treatment. Pressures sufficient to maintain the starting material and the polymeric composition produced therefrom in the liquid phase at temperatures in the above defined range, are superatmospheric pressures, generally above 250 pounds per square inch. Since the pressure is applied primarily to maintain a liquid-phase state, it is generally uneconomical to use pressures higher than about 1000 pounds per square inch, although higher pressures can be used if desired. A preferred pressure is selected from between about 250 and 500 pounds per square inch.

The process of this invention is preferably performed continuously by maintaining a vessel completely filled with the starting material and its partially reacted products, thereby eliminating all oxygen and oxygen-containing vapors from the vessel. The process can also be performed in a batch operation by utilizing any atmosphere which is inert to the starting material at the temperatures and pressures involved herein. A preferred atmosphere for such batch operation is nitrogen.

The temperature of the material in the reaction vessel must be carefully controlled as the starting material reacts rapidly and exothermically at temperatures within the preferred temperature range. Control of the temperature during continuous operation can be provided by means common to the art, such as cooling coils, reflux streams, and the like; while control of batch type operation can be provided by similar means.

The starting material is held at a temperature within the previously defined range for a period which may vary from about one and one-half to about five hours, depending on the temperature reached and maintained. A convenient preferred reaction time, especially when continuous operation is utilized, is between about one and three-quarters hours and about four hours at a temperature in the heretofore described critical range.

The total reaction product from the heating operation is preferably heated in vacuo, or with steam, to distill off unreacted materials, and to yield as the residue, the light colored polymeric composition of the present invention which is soluble in vegetable oils, especially bodied vegetable oils, such as bodied linseed oil. The total reaction product is conveniently subjected to distillation in vacuo to an end point temperature of 200° to 300° C., preferably to an end point of 225° to 260° C., at 5 to 25 millimeters mercury pressure, and most preferably to an end point of 230° to 235° C., at approximately 10 millimeters of mercury pressure.

The following examples are set forth to illustrate the present invention which is not strictly limited thereto, but in each example there can be substituted for the starting material mixture other mixtures falling within the previously described scope of the starting material.

EXAMPLE 1

*Preparation of starting material*

A petroleum derived feed stream having an A.P.I. gravity of approximately 72 degrees and the following analysis:

| | Percent |
|---|---|
| Butadiene | 9.1 |
| C$_4$'s | 2.7 |
| n-Pentane | 0.3 |
| Pentene-1 | 11.2 |
| 1,4-pentadiene | 6.0 |
| 3-methylbutene-1–2-methylbutene-1 | 4.8 |
| Pentene-2–3,3-dimethylbutene-1 | 1.8 |
| Isoprene | 16.4 |
| Cyclopentane and unknown | 4.2 |
| Trans-piperylene–2-methylpentene-1 | 14.4 |
| Cis-piperylene–cyclopentene | 19.3 |
| Cyclopentadiene | 11.6 | was charged into a 6-gallon capacity jacketed vertical reactor which had been previously purged several times with nitrogen to eliminate oxygen and the possibility of peroxide formation. The reactor was fitted with a feed line entering the bottom of the reactor fed by a metered positive displacement pump. Nine baffle plates were placed in the reactor to prevent channeling of the feed stream. A discharge line led from the top of the reactor through a back pressure control valve in a manner so that the reacted feed charge would be discharged while the reactor pressure would be continuously maintained. The reactor was heated by means of hot oil circulating in the heating jacket thereby increasing the pressure and temperature at an even rate. When a temperature of 221° C. at a pressure of 450 pounds per square inch was reached, the feed pump was started and ran continuously for a period of about 36 hours. The feed rate was 12.7 pounds per hour and the holding time in the reactor was 2.7 hours. The total material thus produced had an A.P.I. gravity of 51 degrees.

This total product was charged into the reboiler of a 6-inch diameter, approximately 24 feet high, distillation column packed with ¾ to 1 inch interlocked ceramic saddles and fitted with a condenser. The reboiler was heated with superheated steam until an overhead temperature of 46° C. at a pressure of 200 mm. of mercury was reached at a reboiler temperature of about 124° C. The bottoms product had an A.P.I. gravity of 25.7 degrees at a temperature of 60° F., and an aniline point of 34.2° C. This product, which is suitable for use as the starting material for the process of this invention, consists substantially of from about 70% to about 85% by weight of dimers of isoprene, cis-piperylene and trans-piperylene, and codimers, trimers and cotrimers of isoprene, cis-piperylene, trans-piperylene and cyclopentadiene and from 15% to about 30% by weight of higher polymers of isoprene, cis-piperylene, trans-piperylene and cyclopentadiene and has an initial boiling point within the range of from about 90° C. to about 150° C. and a final boiling point range of from about 330° C. to about 380° C.

The polymeric compositions of Examples 2–6 were produced from a mixture of dimers of isoprene, cis-piperylene and trans-piperylene, and codimers, trimers, cotrimers, and higher polymers of isoprene, cis-piperylene, trans-piperylene and cyclopentadiene, of which said dimers, codimers, trimers, and cotrimers comprised about 75% by weight of the mixture, the remainder being the said higher polymers. The mixture had an A.P.I. gravity of 25.0–25.4 degrees at 60° F.

In each of Examples 2–6, the above mixture was rapidly preheated to a temperature of approximately 25° above the heating temperature, and immediately passed into the bottom of a vertical reaction tower having horizontal baffles at several intervals to prevent channeling of the liquid material. The material was held in the tower at the desired temperature for the indicated period of time. The pressure on the mixture was maintained at 450 pounds per square inch in each example by means of a back pressure valve on the exit stream at the top of the tower. The treated material was then subjected to distillation to an end point of 450° F., at 10–25 mm. mercury pressure, to remove unreacted materials and recover the desired polymeric composition.

Examples 2–4 illustrate the process of the present invention at different heating temperatures and rates within the scope of the present invention. Examples 5 and 6 are illustrative of the result of operation below the lower temperature defined herein.

The process conditions and results of the examples described above are set forth in the table below:

*Process conditions and polymeric composition produced*

| Ex.[1] | Heating Temperature, ° C. | | | Residence Time at Temp., Hrs. | M.P.,[2] ° F. | Sol.[3] | Color[4] |
|---|---|---|---|---|---|---|---|
| | Aver. | Highest | Lowest | | | | |
| 2 | 311 | 323 | 302 | 2.8 | 77 | S | 7 |
| 3 | 312 | 327 | 302 | 1.95 | 80 | S | 7+ |
| 4 | 307 | 315 | 301 | 1.95 | 80 | S | 8+ |
| 5 | 294 | 298 | 286 | 2.8 | 50 | I | 8+ |
| 6 | 280 | 288 | 269 | 2.4 | 71 | I | 6+ |

[1] Example No.
[2] Melting point of product after distillation.
[3] Solubility of product in bodied linseed oil, 5 grams polymeric composition/8 grams linseed oil which was heat bodied under vacuum to Z-8 Gardner viscosity. S=soluble, I=insoluble.
[4] Gardner Color.

As a further illustration of the present invention, Example 7 represents the operation and results of batch type treatment of the starting material of approximately the composition defined in the previous examples. In this example, approximately 250 ml. of starting material was placed in 500 ml. stainless steel bomb, which was flushed with nitrogen gas subsequent to filling to remove air from the bomb. The bomb was sealed and placed in a bath heated to the indicated temperature for the indicated period of time.

Upon removal from the bath, the bomb was cooled and the reaction product poured into a distillation flask and distilled to an end point of 450° F., at 10 mm. mercury pressure. The residue therefrom was the polymeric composition produced by the treatment.

Presented below are the operating conditions and results of Example 7.

*Operating conditions and results*

| Example Number | Heating Temperature, ° C. | Residence Time At Temperature | Solubility in Bodied Linseed Oil[1] |
|---|---|---|---|
| 7 | 311 | 4 hours | Soluble. |

[1] 5 gm. Polymeric Composition/8 gm. of a Linseed Oil which was heat bodied under vacuum to Z-8 Gardner viscosity.

The polymeric compositions of the present invention are useful in the production of varnishes, core oils, mastic compositions, caulking compounds, and the like. These polymeric compositions are also highly useful as the resin ingredient in rubber compounding, where darker compositions are not desirable. The utility of the polymeric compositions of this invention as the resin ingredient in varnishes is greatly enhanced by their solubility in vegetable oils, especially bodied linseed oil, and their light color. Varnishes utilizing these polymeric compositions can be produced by methods and processes commonly used in the varnish industry.

I claim:

1. A process for the thermal production of a light colored, vegetable oil-soluble polymeric composition which comprises heating a mixture in the liquid phase at a temperature above 300 and below 330° C., and at a pressure of more than 250 pounds per square inch in a substantially oxygen free atmosphere, said mixture consisting substantially of from about 70% to about 85% by weight of dimers of isoprene, cis-piperylene and trans-piperylene, and codimers, trimers and cotrimers of isoprene, cis-piperylene, trans-piperylene and cyclopentadiene and from about 15% to about 30% by weight of higher polymers of isoprene, cis-piperylene, trans-piperylene and cyclopentadiene and having an initial boiling point range of from about 90° C. to about 150° C. and a final boiling point range of from about 330° C. to about 380° C.; and distilling the mixture to recover the said composition.

2. A process for the thermal production of a light colored, vegetable oil-soluble polymeric composition which comprises heating a mixture in the liquid phase at a temperature above 300 and below 330° C., and at a pressure of between about 250 and 1000 pounds per square inch in a substantially oxygen free atmosphere, said mixture consisting substantially of from about 70% to about 85% by weight of dimers of isoprene, cis-piperylene and trans-piperylene, and codimers, trimers and cotrimers of isoprene, cis-piperylene, trans-piperylene and cyclopentadiene and from about 15% to about 30% by weight of higher polymers of isoprene, cis-piperylene, trans-piperylene and cyclopentadiene, and having an initial boiling point range of from about 90° C. to about 150° C. and a final boiling point range of from about 330° C. to about 380° C.; and distilling the mixture to recover the said composition.

3. A process for the thermal production of a light colored, vegetable oil-soluble polymeric composition which comprises heating a mixture in the liquid phase at a temperature above 300 and below 330° C., and at a pressure of between about 250 and 500 pounds per square inch for a period of between about one and one-half to about five hours in a substantially oxygen free atmosphere, said mixture consisting substantially of from about 70% to about 85% by weight of dimers of isoprene, cis-piperylene and trans-piperylene, and codimers, trimers and cotrimers of isoprene, cis-piperylene, trans-piperylene and cyclopentadiene and from about 15% to about 30% by weight of higher polymers of isoprene, cis-piperylene, trans-piperylene and cyclopentadiene, and having an initial boiling point range of from about 90° C. to about 150° C. and a final boiling point range of from about 330° C. to about 380° C.; and distilling the mixture to recover the said composition.

4. A process for the thermal production of a light colored, vegetable oil-soluble polymeric composition which comprises heating a mixture in the liquid phase at a temperature above 300 and below 330° C., and at a pressure of between about 250 and 500 pounds per square inch for a period of between about one and three-quarters to about four hours in a substantially oxygen free atmosphere, said mixture consisting substantially of from about 70% to about 85% by weight of dimers of isoprene, cis-piperylene and trans-piperylene, and codimers, trimers and cotrimers of isoprene, cis-piperylene, trans-piperylene and cyclopentadiene and from about 15% to about 30% by weight of higher polymers of isoprene, cis-piperylene, trans-piperylene and cyclopentadiene, and having an initial boiling point range of from about 90° C. to about 150° C. and a final boiling point range of from about 330° C. to about 380° C.; and distilling the mixture to recover the said composition.

References Cited by the Examiner
UNITED STATES PATENTS

| | | | |
|---|---|---|---|
| 2,521,022 | 9/1950 | Rowland | 260—80.7 |
| 2,817,647 | 12/1957 | Habeshaw et al. | 260—82 |

JOSEPH L. SCHOFER, *Primary Examiner.*

JAMES A. SEIDLECK, *Examiner.*